(12) United States Patent
Günther et al.

(10) Patent No.: US 8,905,464 B2
(45) Date of Patent: Dec. 9, 2014

(54) VEHICLE PART WITH STRUCTURAL REINFORCEMENT PART

(75) Inventors: Stefan Günther, Eitorf (DE); Dirk Maier, Siegburg (DE); Stephan Röhner, Dortmund (DE)

(73) Assignee: Metalsa Automotive GmbH, Othestrasse, Bergneustadt (DE)

( * ) Notice: Subject to any disclaimer, the term of this patent is extended or adjusted under 35 U.S.C. 154(b) by 212 days.

(21) Appl. No.: 12/806,975

(22) Filed: Aug. 25, 2010

(65) Prior Publication Data

US 2011/0101734 A1    May 5, 2011

Related U.S. Application Data

(60) Provisional application No. 61/280,010, filed on Oct. 29, 2009.

(51) Int. Cl.
*B62D 25/04* (2006.01)
*B62D 29/00* (2006.01)
B62D 27/02 (2006.01)

(52) U.S. Cl.
CPC .............. *B62D 25/04* (2013.01); *B62D 29/005* (2013.01); *B62D 29/001* (2013.01); *B62D 27/026* (2013.01)
USPC ............. 296/193.06; 296/187.12; 296/203.03

(58) Field of Classification Search
CPC .. B60J 10/0022; B60J 10/0031; B60J 10/004; B60J 10/0071; B60J 10/0088; B62D 21/15; B62D 21/157; B62D 25/04; B62D 27/026; B62D 29/005; F16B 11/006

USPC ............. 296/187.03, 187.05, 187.12, 187.13, 296/193.01, 193.05, 193.06, 203.01, 203.03
See application file for complete search history.

(56) References Cited

U.S. PATENT DOCUMENTS

| | | | | |
|---|---|---|---|---|
| 4,713,283 | A | 12/1987 | Cogswell et al. | |
| 6,805,400 | B2 * | 10/2004 | Bruderick et al. | 296/193.09 |
| 7,560,003 | B2 * | 7/2009 | Naughton et al. | 156/91 |
| 8,047,603 | B2 * | 11/2011 | Goral et al. | 296/187.03 |
| 2008/0001434 | A1 * | 1/2008 | Henkelmann | 296/187.12 |
| 2008/0036235 | A1 * | 2/2008 | Ameloot et al. | 296/102 |
| 2008/0217960 | A1 * | 9/2008 | Kochert et al. | 296/193.06 |
| 2009/0085379 | A1 * | 4/2009 | Takahashi et al. | 296/193.06 |
| 2009/0152896 | A1 * | 6/2009 | Enderich et al. | 296/187.03 |

FOREIGN PATENT DOCUMENTS

DE    44 23 687 A1    1/1996

(Continued)

OTHER PUBLICATIONS

Translation from German to English of DE 44 23 687 (applicant cited); translation provided via the EPO translation service located at http://translationportal.epo.org/emtp/translate/?ACTION=description-retrieval&COUNTRY=DE&ENGINE=google&FORMAT=docdb&KIND=A1&LOCALE=en_EP&NUMBER=4423687&OPS=ops.epo.org&SRCLANG=de&TRGLANG=en; accessed Jan. 8, 2013.*

*Primary Examiner* — Glenn Dayoan
*Assistant Examiner* — Jason S Daniels
(74) *Attorney, Agent, or Firm* — Miller Canfield

(57) ABSTRACT

In a vehicle part with a structural reinforcement part, the structural reinforcement part comprises fibers embedded in plastic material to absorb tensile and/or compressive forces or tensile ($F_z$) and/or compressive stresses.

24 Claims, 5 Drawing Sheets

(56) References Cited

FOREIGN PATENT DOCUMENTS

| | | |
|---|---|---|
| DE | 10 2005 039 925 A1 | 3/2007 |
| DE | 10 2008 011 517 A1 | 9/2009 |
| EP | 1 026 071 A1 | 8/2000 |
| EP | 1 031 467 A2 | 8/2000 |
| WO | WO 03/037668 A1 | 5/2003 |
| WO | WO 2007/057275 A1 | 5/2007 |

* cited by examiner

VEHICLE PART WITH STRUCTURAL REINFORCEMENT PART

CROSS REFERENCE

This patent application claims the benefit and priority of U.S. provisional application 61/280,010, filed Oct. 29, 2009 for VEHICLE PARTS HAVING STRUCTURE REINFORCING MEANS which is hereby fully incorporated by reference.

FIELD OF THE INVENTION

The invention relates to a vehicle part with a structural reinforcement part, to the structural reinforcement part, and a vehicle with at least one such vehicle or structural reinforcement part.

BACKGROUND OF THE INVENTION

Vehicle parts, such as B-pillars of a motor vehicle, with structural reinforcement parts are basically known from the state of the art. They serve to stiffen the vehicle part to enable it to better withstand the forces arising during a crash. For example, DE 10 2005 039 925 A1 discloses a B-pillar to be mounted on a vehicle body including an outward facing formed sheet metal part and an inward facing plastic material support element for receiving the functional parts of a safety seat belt system. The plastic material support element is injection molded onto the formed sheet metal part. This has the purpose of providing a stiff and strong B-pillar better able to transfer the forces acting on it and contributes to stiffening the vehicle body in the assembled state.

While the combination of a formed sheet metal part and the plastic material support element according to this prior art provides a stiffer B-pillar configuration for a vehicle compared to a pure formed sheet metal part, there is, however, the risk during a side impact or a lateral intrusion on the B-pillar of the plastic material support element breaking due to the forces acting on it and there is therefore an even greater danger of injury for the vehicle passengers than would be the case without the provision of such a plastic material support element.

SUMMARY OF THE INVENTION

It is therefore the object of the present invention to provide a vehicle part with a structural reinforcement part wherein, a particularly high safety standard is provided for the vehicle passengers due to improved load carrying ability and the increased stiffness of the vehicle part.

The object is achieved by a vehicle part having a structural reinforcement part in such a manner that the structural reinforcement part comprises fibers embedded in plastic to absorb tensile and/or compressive forces or tensile and/or compressive stresses. Further embodiments of the invention are defined in the dependent claims.

By these means a vehicle part with a structural reinforcement part is provided which, due to the embedded fibers, is particularly well suited to withstand an impact and the high so-called intrusion forces arising thereby. Herein, due to the provision of fibers embedded in plastic material, in the structural reinforcement part, it is possible to keep the intrusion depth in the vehicle in the area of the vehicle part as small as possible upon impact, since the forces arising can be transferred into the structure by the fibers. Permanent deformation of the vehicle part is thus also kept as small as possible. The embedded fibers also enable an intrinsically durable element to be created that does not break uncontrollably upon impact of an intrusion force. Rather, the forces introduced can be selectively absorbed by the fibers and transferred into the structure of the rest of the vehicle. The vehicle part can thus absorb strong forces in comparison with traditional vehicle parts of sheet metal, before a profile loses its stiffness due to buckling.

The fibers can have an intentional orientation within the structural reinforcement part. Furthermore, it is also possible to provide the fibers in a random arrangement within the structural reinforcement part which ensures stiffening in various directions. When the fibers are oriented in intentional directions, stiffening can only be provided in individual directions, such as only to absorb tensile stresses. Particularly crossing of the fiber orientations is also possible, such as by the arrangement of the fibers in a plurality of layers in various directions.

The structural reinforcement part is advantageously oriented toward the interior of the vehicle in relation to the later installed position of the vehicle part in the vehicle, that is on the inside of the vehicle part. This is usually the side of the vehicle part facing away from the impact, if an external force is applied to it during a crash. Due to the arrangement on the side of the vehicle part facing away from the impact, the latter can be reinforced from this side to thus counteract the impact force. This enables a particularly high force or energy absorption, wherein the structural profile cross section of the vehicle part remains intact as long as possible and over a long impact path of the impact force. The vehicle part and the structural reinforcement part thus absorb the force and energy of the impact over a long time and over a long path thus providing the vehicle passengers with a higher standard of protection.

An orientation of the fibers in the longitudinal direction of the structural reinforcement part, and thus also of the vehicle part, in particular, results in them being able to absorb tensile stresses as required, thus counteracting compression of the vehicle part and buckling of its profile cross section. It is sufficient if the fibers are only arranged in part of the structural reinforcement part, in particular in a lateral region, and in a region remote from the vehicle part and facing toward the vehicle interior in the installed position.

The fibers can be metallic, but also non-metallic. Basically, the combination of metallic and non-metallic fibers is possible in the structural reinforcement part, this being particularly suitable if different types of stresses arising during a vehicle crash and must be absorbed along the full extent of the structural reinforcement part. Steel fibers embedded in plastic material, in particular, will result in greater stiffness than embedded non-metallic fibers, which result in higher elasticity, and which can promote shape resilience, so that permanent deformations after a crash are less pronounced.

The fibers can be embedded in the plastic material in non-prestressed form. It has turned out to be particularly advantageous, however, to provide the embedded fibers as a tensile prestressed fiber combination, since it is able to withstand higher impact or intrusion forces, so that the vehicle part is provided with even better reinforcement and stiffening. In comparison with the embodiment of a structural reinforcement part having embedded fibers in non-prestressed form, a smaller wall thickness of the vehicle part can be provided with prestressed embedded fibers, while the possible force load remains the same. The provision of prestressed fibers thus enables material economies and thus also a substantial weight reduction in comparison to an embodiment with non-prestressed fibers.

Furthermore, the embedded fibers can be oriented in such a manner that the profile of the vehicle part as it is stressed by an impacting force, counteracts a deformation of the profile, in particular its tendency to open. Herein, the fibers can be arranged in a direction transverse to the longitudinal extension of the structural reinforcement part. As already mentioned, various angles of arrangement of the embedded fibers can be intentionally provided with respect to each other, in particular, the fibers can be arranged in various layers having different orientations.

A further reinforcement of the structural reinforcement part, and thus also the combination of the vehicle part and the structural reinforcement part, is possible by providing the structural reinforcement part with at least one stiffening element, in particular at least one web. It has turned out to be particularly advantageous to arrange the at least one stiffening element in the direction of the vehicle part and/or an intrusion force. It is therefore advantageously arranged on that side of the structural reinforcement part which is directed toward the vehicle part and is connected to the latter. Such stiffening elements or webs are thus arranged in a manner facing toward the outside of the vehicle, so that a force acting on the vehicle part may lead to it being deformed, but the regions being deformed can be supported on the stiffening elements of the structural reinforcement part in an interlocking manner. Further deformation is thus counteracted.

Such stiffening elements may only be partially provided in the areas of the structural reinforcement part, in which additional reinforcement of the vehicle part structure seems necessary. It is thus possible to selectively influence the deformation behavior not only of the structural reinforcement part but also of the vehicle part, or the combination of the vehicle part and the structural reinforcement part, wherein denting or buckling of the load bearing structure of the vehicle part or of its profile cross section is allowed or prevented only in certain areas.

It is further advantageous if the structural reinforcement part includes at least one sealing and/or adhesive flange molded on it and/or adhesive surfaces in the area of or on the at least one stiffening element. Particularly in the area of the stiffening elements this enables interlocking and strong engagement of the structural reinforcement part on the vehicle part so that the supporting action of the stiffening elements can be ensured for the vehicle part. The provision of a mould-adhered sealing flange is advantageous to prevent the ingress of damp between the structural reinforcement part and the vehicle part to safely prevent corrosion on the vehicle part, in particular those consisting of metal. Due in particular to the irregular shape of the structural reinforcement part, especially due to the provision of undercuts, advantageously adapted to the shape of the vehicle part, there is certainly a danger that the ingress of damp can lead to condensation forming in the undercuts of the vehicle part leading to corrosion if sealing flanges are not provided.

Furthermore, the structural reinforcement part advantageously includes at least one receiving means and/or a flange for connection with at least one further component, in particular an integrally formed receiving means and/or an integrally formed flange. This can serve to create a connection, for example for a belt deflector, a support for the latch striker of a vehicle door, a belt height adjustment etc. Since the structural reinforcement part is usually arranged on the inside with respect to the vehicle, it is more advantageous to provide the receiving means on this structural reinforcement part than on the vehicle part itself, which faces toward the outside with respect to the vehicle. The structural reinforcement part is closer to the vehicle interior. Furthermore, it has a particularly high stability due to the embedded fibers, so that a deformation of the structural reinforcement part caused by the attachments and elements mounted on it can be essentially discounted.

The position of the stiffening elements and the fibers within the structural reinforcement part can be varied, as can the wall thickness of the structural reinforcement part, depending on the load acting on it. It is thus possible to provide varying wall thicknesses depending on the area in which particularly great forces are to be expected to act on the structural reinforcement part during a crash. The number of embedded fibers or layers of embedded fibers can also be varied across the extension of the structural reinforcement part depending on the load.

The structural reinforcement part can be attached to the vehicle part in a releasable manner. It is also possible to attach the structural reinforcement part on the vehicle part in an unreleasable manner. In particular, the structural reinforcement part and the vehicle part can be joined, in particular by means of an interlocking and/or frictional engagement, adhesive connection, gluing, riveting, double-bending etc.

To connect the vehicle part and the structural reinforcement part, in particular, an automotive structural adhesive can be used. The vehicle part can be formed as a cold or warm formed metal-sheet shell, wherein advantageously adhesive surfaces are formed on the structural reinforcement part as an outer contour of the stiffening elements, wetted with adhesive and adhesively glued to the vehicle part. Instead of an automotive structural adhesive, any other type of adhesive can also be used which ensures strong bonding, in particular of a metal part in the form of the vehicle part, and a plastic part in the form of the structural reinforcement part. A combination with riveting or any other joining method, such as double-bending, results in an even stronger bond between the vehicle part and the structural reinforcement part.

By providing the structural reinforcement parts, which are joined with their respective vehicle parts, it is also possible to mount further functional components on the structural reinforcement parts at an early stage before the structural reinforcement parts are combined with the vehicle parts. This facilitates particularly easy and good assembly on the one hand and a widely varied modular structure of the combination of vehicle part and structural reinforcement part on the other hand, so that a great number of further functions can also be integrated in the area of the structural reinforcement part as required by the application.

By providing the structural reinforcement part with embedded fibers, furthermore, particularly favorable acoustic properties for each vehicle part can be achieved with respect to the composite body structure, since the structural reinforcement part has such structural stability that vibrating elements are not created as it is mounted on the vehicle part, which could otherwise lead to rattling or other types of noise. Rather, a structurally stable unit can be created in the present case of the structural reinforcement part and the vehicle part.

In its application to a motor vehicle, in particular an automobile or a truck or lorry, for which a correspondingly equipped vehicle part or structural reinforcement part is provided, good separability of the vehicle part and the structural reinforcement part is even provided at the end of the vehicle's service life, which is important today to be able to separate out waste materials, in particular metallic and non-metallic materials, which are then recycled for further use.

Vehicle parts which are particularly suited to be equipped with such a structural reinforcement part and which are exposed to particularly high loads, in particular, during lateral impact on a vehicle, are for example A-pillars, B-pillars, side impact protection devices and safety roll bars of a motor vehicle. Such a structural reinforcement part can of course also be arranged in other vehicle parts, where its stiffening effect, in particular in combination with vehicle parts that are exposed or will be exposed to dynamic loads, can be particularly advantageous.

The plastic material in which the fibers are embedded, in particular embedded in a prestressed state, can be, for example, an artificial resin material which has a light weight on the one hand and is sufficiently stiff on the other, so that the structural reinforcement part can be easily given any desired shape depending on the conditions of the vehicle component. Particularly, polyamide 6 (PA6), glass-fiber-reinforced or plastic materials that are thermally resistant to be able to withstand the processing temperatures arising in cataphoretic dip coating of above 200° C. over 15 min, can also be used.

BRIEF DESCRIPTION OF THE DRAWINGS

An exemplary embodiment will be described in the following with reference to the drawings to explain the invention in more detail, wherein.

DETAILED DESCRIPTION OF THE INVENTION

Figure 1:
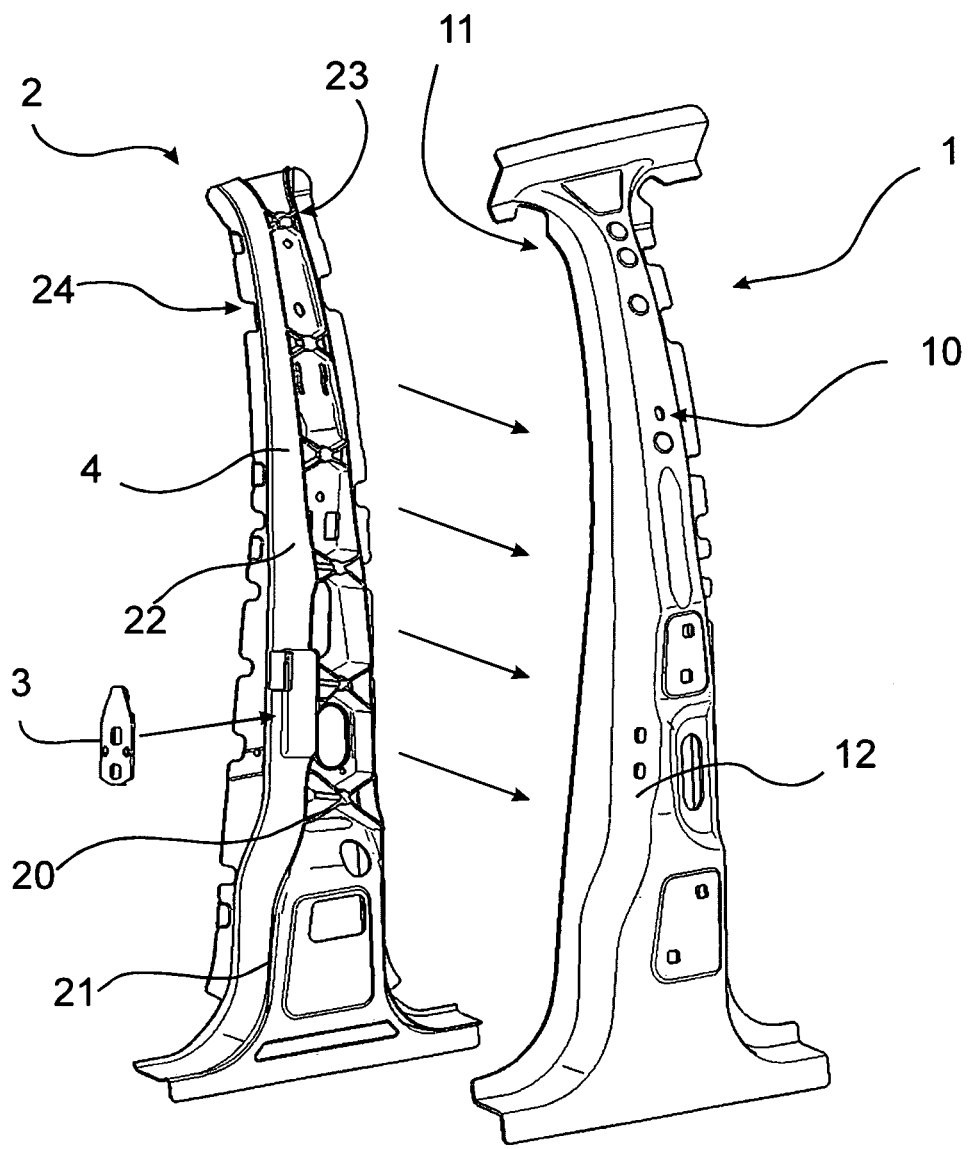
FIG. 1 is a perspective view of a vehicle part according to the present invention with a structural reinforcement part according to the present invention, and a receiving means for connected components in a view of the outside of the vehicle part.

FIG. 1 is a perspective view of a vehicle part 1 with a structural reinforcement part 2. Vehicle part 1 has the structure of a shell in the form of a B-pillar of a vehicle or automobile. It is of a metal, in particular, and has an outside 10 facing toward the exterior in the installation position in a vehicle, and an inside 11 facing the interior of the passenger compartment.

The structural reinforcement part 2 is also structured having an irregular shape which, however, matches the shape of the vehicle part. The structural reinforcement part also has an outside 23 facing, however, vehicle part 1, and an inside 24, facing a passenger compartment in the installed position.

The structural reinforcement part is of a plastic material with fibers 4 embedded in it. The latter can be endless fibers or short fibers, i.e. fiber sections. The embedded fibers extend either in the longitudinal direction of the structural reinforcement part or at an angle thereto. It is of course possible to orient the fibers arranged in the structural reinforcement part also in various directions to be able to absorb and transfer deformation forces acting on the structural reinforcement part in various directions, that is to create stiffness against deformation in various directions.

In addition to the provision of embedded fibers, the structural reinforcement part has also stiffening elements in the form of webs 20, always arranged crosswise at an angle to the longitudinal direction of the structural reinforcement part along the latter and spaced to each other. A concentration of webs in these spaced areas locally leads to a particularly high stiffness and thus denting stiffness in these areas. The webs can also have a rhomboid or polygonal form, advantageously as a function of each stress to be envisaged. Especially in the case where the fibers are arranged in the longitudinal direction of the structural reinforcement part to be able to absorb tensile stresses particularly well as forces act on the vehicle part, the arrangement of the stiffening elements in the form of webs in an angled disposition is particularly advantageous to create high stiffness in the direction of an acting force F as indicated by an arrow in FIG. 2. In the areas in which the webs are arranged a stiffness oriented transverse to the fibers can be additionally achieved.

Webs 20 obliquely arranged with respect to the longitudinal extension of the structural reinforcement part, in the exemplary embodiment shown in FIG. 1, are connected at their end faces by means of longitudinal webs 21 arranged in the longitudinal direction of the structural reinforcement part. These longitudinal webs extend over the entire length of the structural reinforcement part. On their outsides they each have an adhesive flange 22. This can be used to bond structural reinforcement part 2 to vehicle part 1 in a simple manner. A structural adhesive, such as Betamate, is a particularly suitable adhesive for this. Furthermore, an additional connection can be achieved by riveting or double-bending or any other joining method. Corresponding through holes can be provided in the vehicle part formed as a cold-worked part or as a hot-worked part, as well as in the structural reinforcement part. The vehicle part in the form of a high-strength sheet-metal component has side walls 12 corresponding to the two adhesive flanges 22. This enables an interlocking connection to be established between the vehicle part and the structural reinforcement part.

The wall thickness, in particular of longitudinal webs 21, but also of webs 20, can be varied depending on the load. These webs can thus have varying wall thicknesses to especially optimize the absorption of forces. In the area in which a wider surface area is conceivable to support the vehicle part, the wall thickness can be greater, whereas it can be smaller in areas in which only small forces are to be expected.

Figure 5:
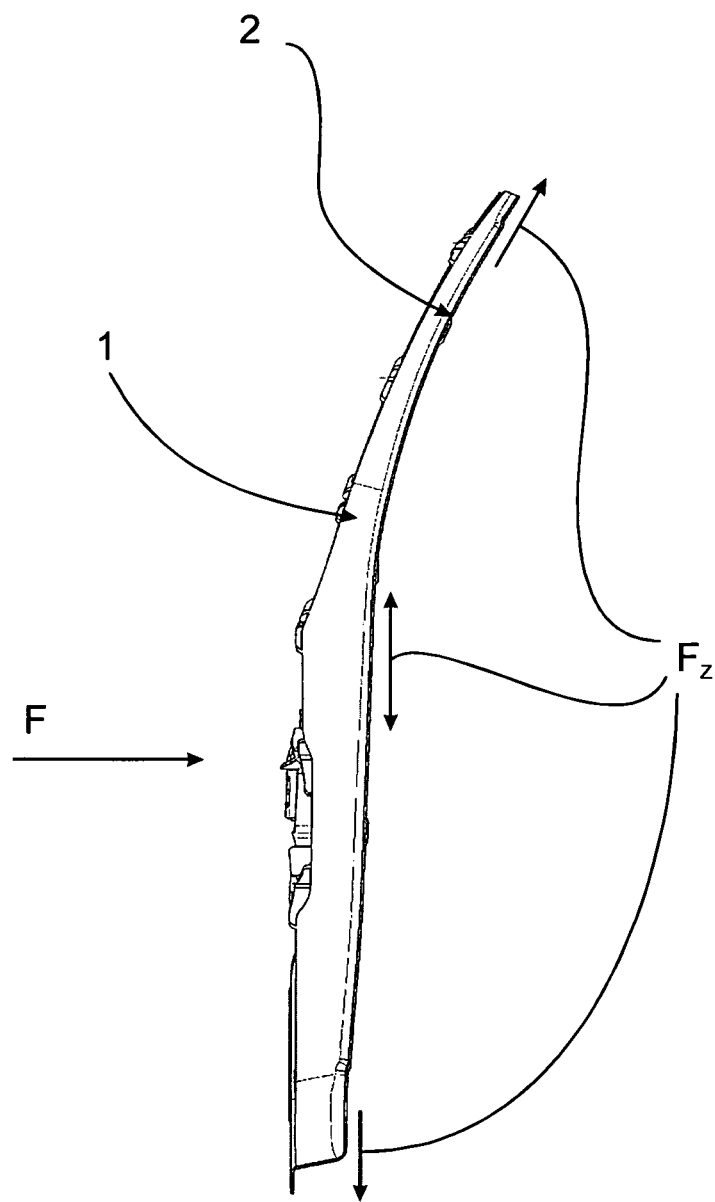
FIG. 5 is a side view of the vehicle part with the structural reinforcement part joined to it, also showing arrows to indicate the action of the stresses.

Fibers 4 embedded in the structural reinforcement part can be, for example, steel fibers or also other metallic or non-metallic fibers. In particular it is possible to prestress them in the longitudinal direction of the structural reinforcement part to enable particularly good absorption of tensile stresses arising upon impact. This is indicated in FIG. 5, where it can be seen quite clearly that forces (arrow F) acting on the outside 10 of vehicle part 1 lead to tensile stresses (arrows $F_z$) in structural reinforcement part 2 and their diversion leads through fibers 4.

FIG. 1, in addition to the vehicle part and the structural reinforcement part, shows a receiving means 3 to serve as a connection with a further component. This receiving means can be configured, for example, as a support for a latch striker, as a receiving means for a belt redirecting device, as a receiving means for a belt height adjustment etc. This receiving means 3 is connected with structural reinforcement part 2, or is attached or integrally formed on it. The assembled state can be better seen in FIG. 3a. This receiving means, as can be seen from FIGS. 1-4, is arranged in a particularly reinforced area of the structural reinforcement part, namely in the area of a plurality of webs 20, so that deformations due to forces acting on the further component or the receiving means 3 can be largely avoided.

Figure 2:
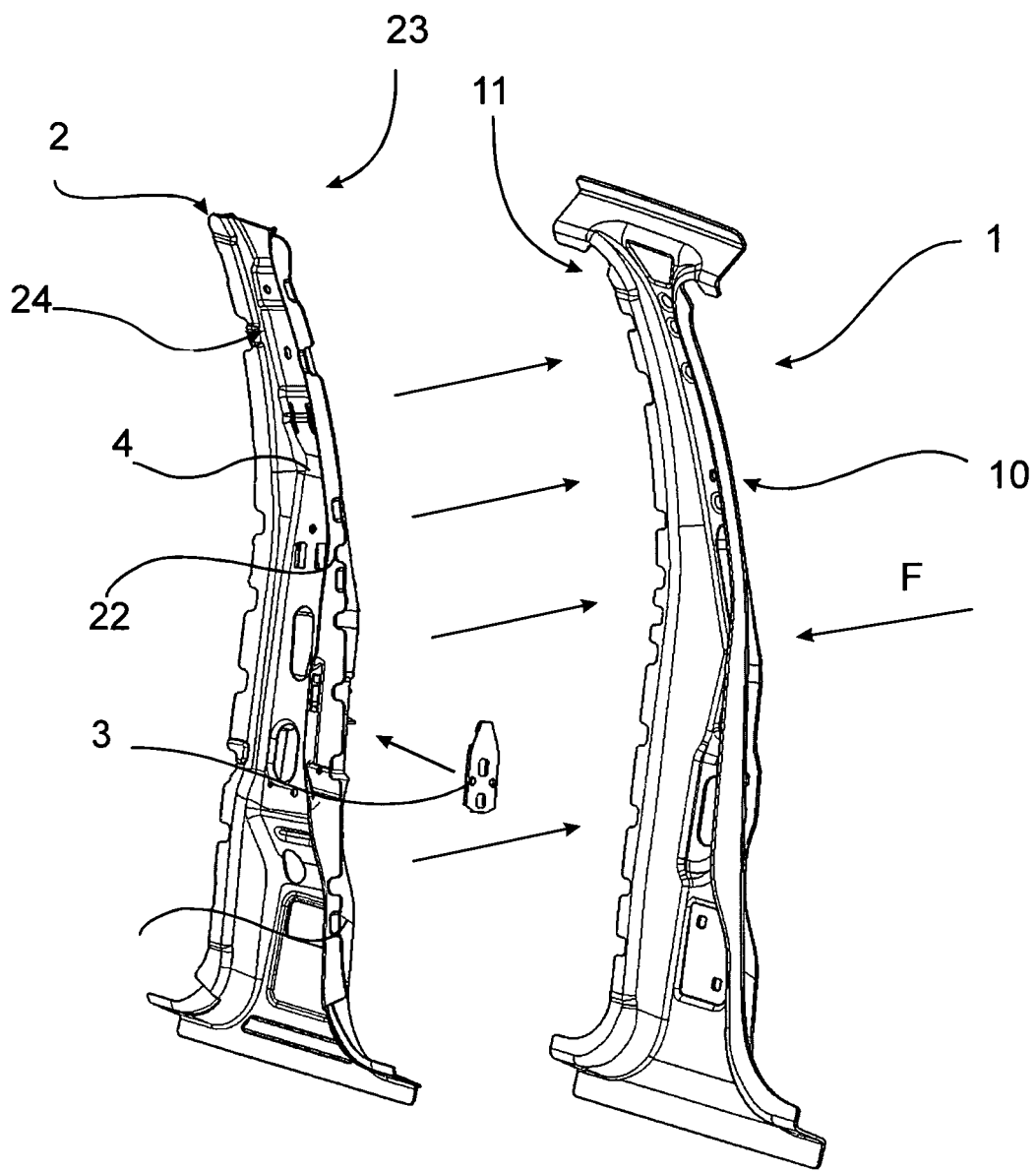
FIG. 2 is a perspective view of the vehicle part rotated by 180°, of the structural component and the receiving means according to FIG. 1, in the view of the inside of the vehicle part and the structural reinforcement part.

FIG. 2 shows a view of each inside 11, 24 of vehicle part 1 and structural reinforcement part 2, where it can be clearly seen that both parts 1, 2 are in the form of shells. To achieve an interlocking fit, at least partially, the webs or other elements of the structural reinforcement part and the vehicle part have a largely matching configuration. On the application of force, webs 20, 21, in particular, then will support the vehicle part being deformed.

Figure 3A:
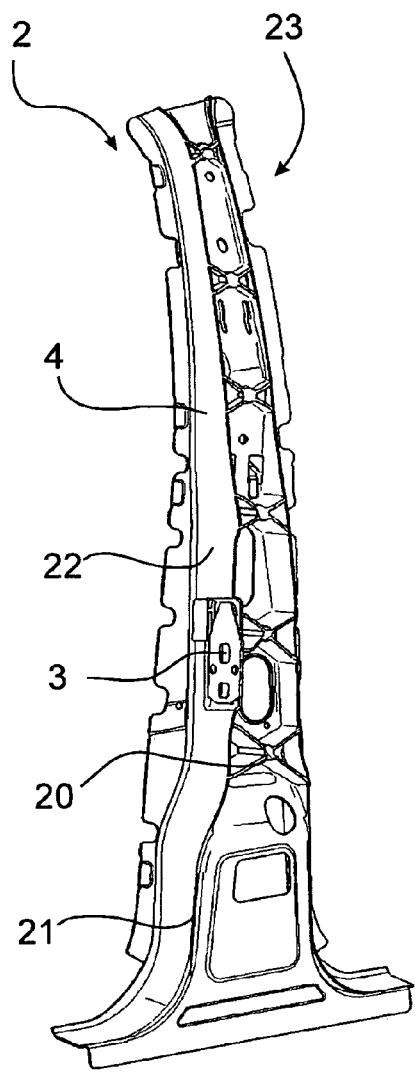
FIGS. 3a and 3b are perspective views of the structural reinforcement part with the receiving means according to FIG. 1, in a view from outside and inside.
Figure 3B:
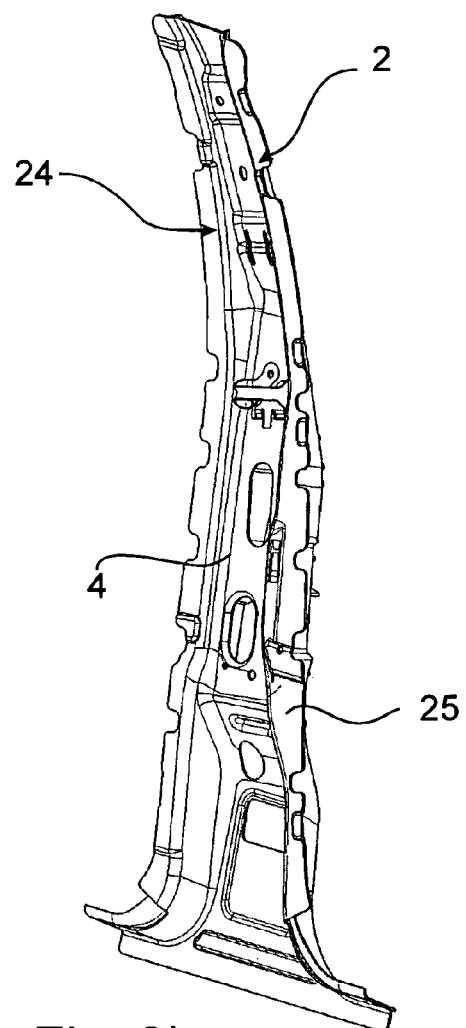

Structural reinforcement part 2 joined to receiving means 3 is shown in FIGS. 3a and 3b, one showing the view of the outside 23 (FIG. 3a) and one showing the view of the inside 24 (FIG. 3b). The heavily structured and complex shape of the structural reinforcement part can be seen quite clearly here. Structural reinforcement part 2 has flange sections 25 on the outside serving to establish a connection with vehicle part 1, but also with other adjacent vehicle parts.

Figure 4:
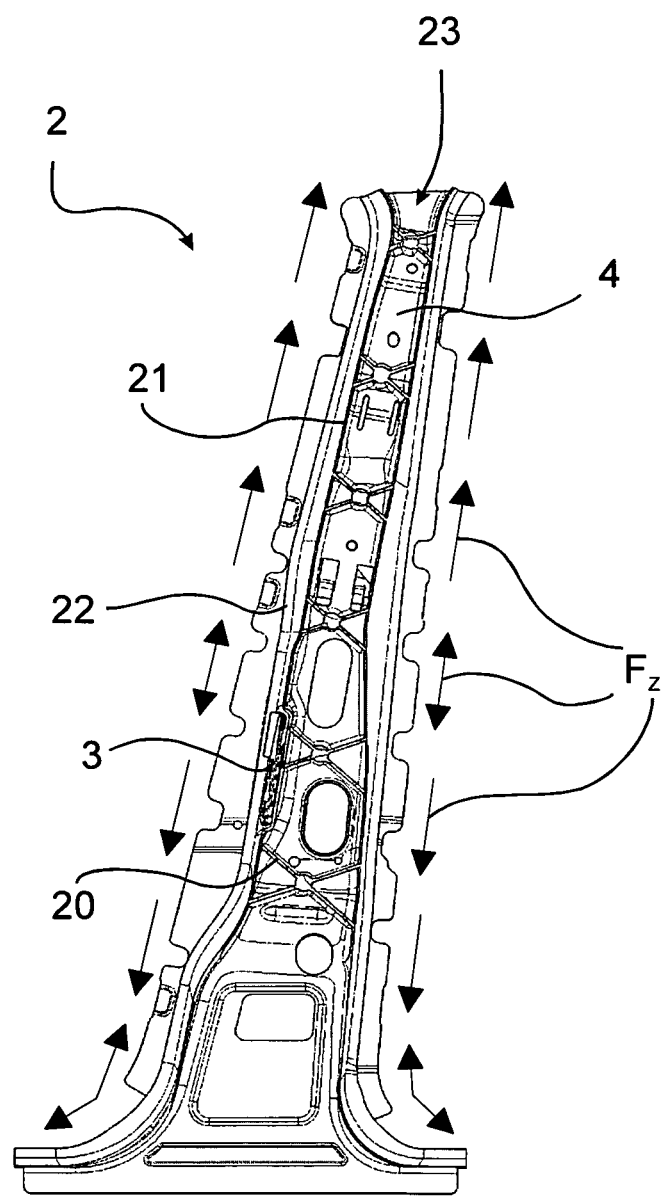
FIG. 4 is a plan view of the outside of the structural reinforcement part with the receiving means with schematic representation of stress distributions.

FIG. 4 now shows how stresses act within stressed structural reinforcement part 2, where it can be clearly seen that a force impacting on the outside of the vehicle part leads to tensile stresses (arrows $F_Z$) within the structural reinforcement part which are transferred along the longitudinal extension of structural reinforcement part 2. This can be seen also from FIG. 5, wherein here an assembly of the vehicle part and the structural reinforcement part is shown in a side view. It can also be seen quite clearly that the tensile stresses (arrows $F_Z$) particularly acting toward the interior of a vehicle, i.e. on its inside 24, are absorbed and transferred in the structural reinforcement part. Fibers 4 are correspondingly arranged, also in layers providing various orientations of the fibers as required to absorb the tensile stresses and to counteract buckling and denting of the vehicle part.

In addition to the above mentioned embodiments shown in the drawings, of vehicle parts and structural reinforcement parts, many others can also be provided, wherein the structural reinforcement part comprises fibers embedded in a plastic material for absorbing tensile and/or compressive forces and tensile and/or compressive stresses to be particularly able to transfer and thus absorb as much as possible the impact forces arising during a crash. In addition to the provision of such a structural reinforcement part, for example, at an A and/or B-pillar of a motor vehicle, in particular an automobile or a truck or lorry, it can also be advantageously provided in a side impact protection device and in safety roll bars of a motor vehicle.

LIST OF REFERENCE NUMERALS 1 vehicle part
2 structural reinforcement part
3 receiving means
4 fibers
10 outside
11 inside
12 side wall
20 web
21 longitudinal web
22 adhesive flange
23 outside
24 inside
F intrusion force
$F_Z$ tensile force

What is claimed is:
1. A vehicle part, comprising:
a structural reinforcement part, wherein the structural reinforcement part comprises fibers embedded in plastic material to absorb tensile and/or compressive forces or tensile (FZ) and/or compressive stresses,
wherein the fibers are provided in a prestressed form or as a tensile prestressed fiber combination,
and wherein the fibers have an intentional orientation in individual directions within the structural reinforcement part,
and wherein the structural reinforcement part includes at least one integrally formed sealing and adhesive flange and at least one receiving plate that is connected with the integrally formed sealing and adhesive flange for connection with at least one further component.
2. The vehicle part according to claim 1, wherein metallic and/or non-metallic fibers are provided.
3. The vehicle part according to claim 2, wherein the fibers are embedded in the plastic material in a prestressed state, and wherein the structural reinforcement part is releasably attached on the vehicle part.
4. The vehicle part according to claim 3, wherein the structural reinforcement part and the vehicle part are joined, in particular connectable or connected by means of an interlocking and/or frictional engagement, or double-bending and wherein the structural reinforcement part is provided with at least one stiffening element.
5. The vehicle part according to claim 2, wherein a vehicle part shell is of metal, and wherein the vehicle part is exposed or exposable to a dynamic load in operation, of a vehicle equipped with it, in particular a B-pillar, an A-pillar, a side impact protection device or a safety roll bar.
6. The vehicle part according to claim 1, wherein the structural reinforcement part is attached on the vehicle part in an unreleasable manner.
7. The vehicle part according to claim 1, wherein the structural reinforcement part is provided with at least one stiffening element.
8. The vehicle part according to claim 7, wherein the at least one stiffening element is arranged in the direction of the vehicle part and/or an intrusion force acting on it.
9. The vehicle part according to claim 7, wherein the stiffening element is at least one web.
10. The vehicle part according to claim 1 including a vehicle part shell that is made of metal.
11. The vehicle part according to claim 1, wherein the vehicle part is exposed or exposable to a dynamic load in operation, of a vehicle equipped with it, in particular a B-pillar, an A-pillar, a side impact protection device or a safety roll bar.
12. The vehicle part according to claim 1, wherein the receiving means is integrally formed with the sealing and adhesive flange.
13. The vehicle part according to claim 1, wherein the fibers are arranged in a region remote from the vehicle part and facing toward the interior of a vehicle in an installed position.
14. The vehicle part according to claim 1, wherein the sealing and adhesive flange extends a longitudinal length of the reinforcement part.
15. A vehicle part comprising
a vehicle part shell having a side wall,
a plastic structural reinforcement shell with embedded fibers, with an integrally formed adhesive flange that correspond to and engages the side wall, the adhesive flange is adjacent to flange sections on the outside of the structural reinforcement shell;
at least one stiffening element arranged as a web crosswise at an angle to a longitudinal direction of the adhesive flange of the structural reinforcement shell; and
a receiving plate for connecting other components, which is secured between the side wall and the adhesive flange, wherein the structural reinforcement shell is adhered and sealed on the vehicle part shell.

16. The vehicle part of claim 15 wherein the adhesive flange extends an entire longitudinal length of the structural reinforcement shell.

17. The vehicle part of claim 15 wherein the web is integral with the adhesive flange directly adjacent to the receiving means.

18. The vehicle part of claim 15 wherein the embedded fibers are oriented in the longitudinal direction of the adhesive flange.

19. The vehicle part of claim 15 wherein the embedded fibers are prestressed in the longitudinal direction.

20. The vehicle part of claim 15 wherein the embedded fibers are arranged at an angle to the longitudinal direction of the structural reinforcement shell.

21. The vehicle part of claim 15 wherein the embedded fibers are a combination of metallic and non-metallic fibers.

22. The vehicle part of claim 15 wherein the embedded fibers are arranged in layers having different orientation.

23. The vehicle part of claim 15 wherein the receiving plate is integrally formed on the structural reinforcement shell.

24. The vehicle part of claim 15 wherein the web is integrally formed between two adhesive flanges that taper inward to sealingly adhere to two corresponding side walls of the vehicle part shell.

* * * * *